US012738799B2

(12) United States Patent
Męczkowski et al.

(10) Patent No.: US 12,738,799 B2
(45) Date of Patent: Sep. 15, 2026

(54) MOTOR RADIATOR

(71) Applicant: Hamilton Sundstrand Corporation, Charlotte, NC (US)

(72) Inventors: Tomasz Męczkowski, Wroclaw (PL); Sebastian Żuraw, Wroclaw (PL); Robert Zieliński, Wroclaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 224 days.

(21) Appl. No.: 18/598,963

(22) Filed: Mar. 7, 2024

(65) Prior Publication Data

US 2024/0322640 A1 Sep. 26, 2024

(30) Foreign Application Priority Data

Mar. 23, 2023 (EP) .................................... 23461536

(51) Int. Cl.

| | |
|---|---|
| ***H02K 5/20*** | (2006.01) |
| ***B64D 33/10*** | (2006.01) |
| *B64D 27/30* | (2024.01) |

(52) U.S. Cl.

CPC ............. *H02K 5/207* (2021.01); *B64D 33/10* (2013.01); *B64D 27/30* (2024.01)

(58) Field of Classification Search

CPC ............ H02K 1/20; H02K 5/207; H02K 9/02; H02K 9/04

See application file for complete search history.

(56) References Cited

U.S. PATENT DOCUMENTS

| | | | | |
|---|---|---|---|---|
| 5,409,056 | A | 4/1995 | Farry et al. | |
| 6,300,693 | B1 * | 10/2001 | Poag | H02K 5/203 310/58 |
| 6,777,836 | B2 | 8/2004 | Tong et al. | |
| 8,760,015 | B2 | 6/2014 | Himmelmann | |
| 11,271,450 | B2 * | 3/2022 | Yoshioka | H02K 24/00 |
| 2003/0071525 | A1 * | 4/2003 | Tong | H02K 1/20 310/65 |
| 2010/0289349 | A1 * | 11/2010 | Maduskuie | H02K 1/20 310/59 |

(Continued)

FOREIGN PATENT DOCUMENTS

| | | |
|---|---|---|
| CN | 107623390 A * | 1/2018 |
| CN | 111357170 A | 6/2020 |

(Continued)

OTHER PUBLICATIONS

CN-107623390-A Machine Translation (Year: 2018).*
CN-112104116-A Machine Translation (Year: 2020).*

*Primary Examiner* — Oluseye Iwarere
*Assistant Examiner* — Masoud Vaziri
(74) *Attorney, Agent, or Firm* — Kinney & Lange, P.A.

(57) ABSTRACT

A cooling structure for a rotary electric machine, the structure comprising an annular radiator body defining an axis X between a first end and a second end, the annular body having a radially inner wall and a radially outer wall and a plurality of channels defined between the radially inner wall and the radially outer wall, each extending from the first end to the second end, each channel having an inner surface defining the channel through which a coolant flows, in use, and wherein surface features are provided on the inner surface of the channels.

11 Claims, 1 Drawing Sheet

(56) References Cited

U.S. PATENT DOCUMENTS

2011/0140550 A1* 6/2011 Brandl .................. H02K 5/207 310/57
2013/0076168 A1* 3/2013 Memminger ........... H02K 9/12 310/54
2014/0354090 A1* 12/2014 Chamberlin .......... H02K 5/203 310/54
2016/0111923 A1* 4/2016 Bushen .................. H02K 1/20 310/59
2021/0021163 A1* 1/2021 Ma ......................... H02K 9/12
2021/0036590 A1* 2/2021 Bott ........................ H02K 5/20
2021/0135516 A1* 5/2021 Page ...................... H02K 5/203
2021/0328472 A1* 10/2021 Diehl ...................... H02K 3/24
2021/0336495 A1* 10/2021 Li ........................ H02K 7/1838
2021/0376677 A1* 12/2021 Klonowski ............. H02K 9/02
2022/0045576 A1* 2/2022 Druant .................... H02K 3/24
2023/0082277 A1* 3/2023 Goykhman ........... B64D 33/08 310/54
2023/0170766 A1* 6/2023 Morgan ................ H02K 9/227 310/64
2023/0378827 A1* 11/2023 Ertas ....................... H02K 9/16
2024/0008220 A1* 1/2024 Kadhim ............ H05K 7/20772

FOREIGN PATENT DOCUMENTS

CN 211981635 U 11/2020
CN 112104116 A * 12/2020 ............... H02K 1/20

* cited by examiner

MOTOR RADIATOR

CROSS-REFERENCE TO RELATED APPLICATION(S)

The present application claims priority to European Application No. 23461536.7 filed on Mar. 23, 2023, the contents of which are incorporated by reference herein in its entirety.

TECHNICAL FIELD

The present disclosure is concerned with a cooling structure or radiator for a rotary electrical motor.

BACKGROUND

A rotary electrical machine or motor comprises a rotor and a stator mounted coaxially within a motor housing. In an inner-rotor type, the motor comprises a rotating motor shaft rotatable about an axis, a rotor rotatably disposed to the rotor shaft and a stator mounted coaxially around the rotor, within the housing. The rotor has a rotor core and a plurality of permanent magnets supported by the core. The stator is provided with windings between gaps around the stator. Other electric motor designs have an outer-rotor design where the rotor is mounted and rotates around the stator. In either case, heat is generated by the relative rotation of the rotor and the stator and so typically, motors are provided with a cooling structure (or radiator) provided within the housing-typically as an annular body defining a plurality of axially extending channels between the outermost of the rotor and the stator, and the housing. The cooling structure is provided with one or two inlets at a first end and an outlet at a second, opposite end. Coolant e.g. air or liquid is provided to the structure at the inlet (in the case of two inlets, these may be used selectively depending on the context in which the motor is mounted) and flows through the channels to the outlet. The walls of the channels are adjacent the motor structure and so heat generated by operation of the motor passes through the walls and is absorbed by the coolant as it passes through the channels. The coolant thus becomes warmer by drawing heat away from the motor as it passes through the channels and warm coolant is ejected at the outlet.

While conventional radiators have proven fit for purpose, there is a desire for improved cooling structures that can provide more effective and efficient cooling without adding to the cost, complexity, size or weight of the structure.

SUMMARY

According to the present disclosure, there is provided a cooling structure for a rotary electric machine, the structure comprising an annular radiator body defining an axis X between a first end and a second end, the annular body having a radially inner wall and a radially outer wall and a plurality of channels defined between the radially inner wall and the radially outer wall, each extending from the first end to the second end, each channel having an inner surface defining the channel through which a coolant flows, in use, and wherein surface features are provided on the inner surface of the channels.

BRIEF DESCRIPTION OF THE DRAWINGS

Examples of the radiator according to this disclosure will now be described with reference to the drawings. It should be noted that these are examples only, and variations are possible within the scope of the claims.

DETAILED DESCRIPTION

Figure 1:
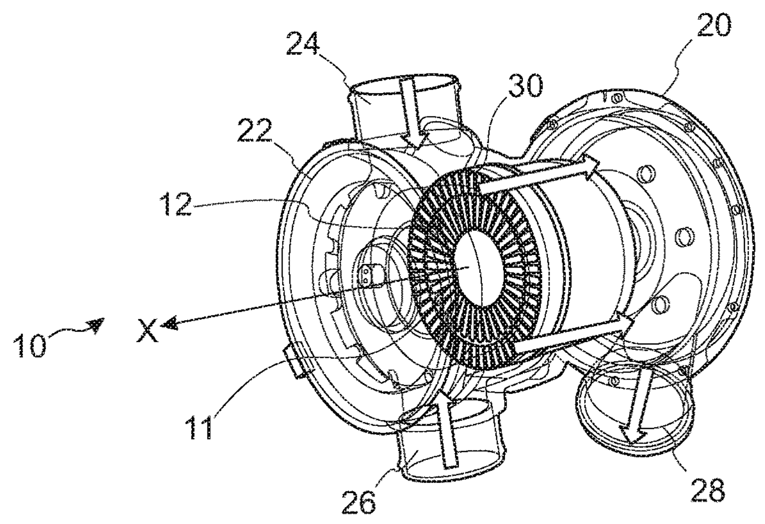
FIG. 1 is a three-dimensional view of a conventional rotary electric motor with a cooling structure.
Figure 2:
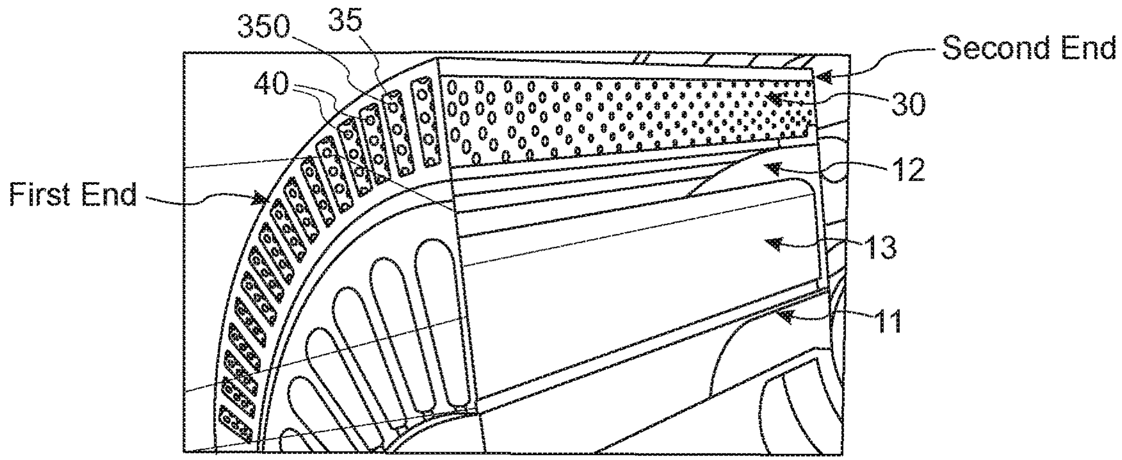
FIG. 2 is a partial section of a motor and cooling structure according to the disclosure.

As mentioned above, a rotary electrical machine or motor typically comprises a rotor and a stator. In the example shown in FIG. 1, the motor 10 has a rotor in the form of a rotatable shaft 11, rotatable about an axis X around which is mounted, coaxially, a stator 12. The stator includes stator windings 13 (seen in FIG. 2) in stator gaps around the stator body as is conventional. The structure and operation of the rotary motor are conventional and well-known and will not be described further. The example shows an inner-rotor design. The motor could, however, also be an outer rotor/inner-stator design. Again, such motors are conventional and will not be described further.

Due to the rotation of the rotor relative to the stator, voltage and heat are generated at the stator. For efficiency and, in some cases, safety, there is a need to remove that heat from the motor. This is typically provided for by a cooling structure.

Figure 3:
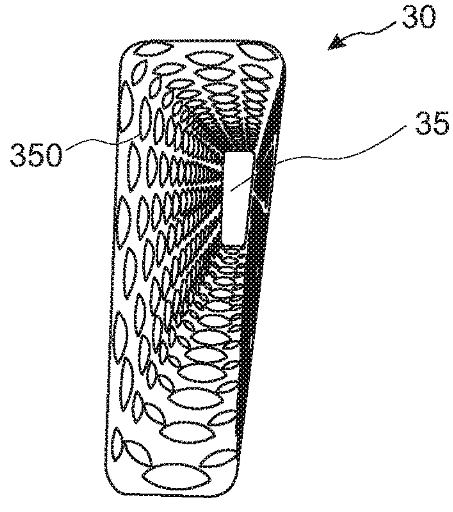
FIG. 3 is a detailed view of a channel of a radiator according to the disclosure.

A housing 20 containing the stator and the rotor also contains a cooling structure between the motor parts 11, 12 and the housing 20. The cooling structure is typically an annular radiator 30 mounted around the motor parts having a plurality of channels 35 (seen in FIGS. 2 and 3) extending axially from one end of the motor to the other. A manifold 22 is provided on the housing to provide coolant to and for coolant to exit from the radiator. In the example shown, the manifold 22 is provided with two inlets 24, 26 to which coolant can be provided selectively. For example, if the motor is provided for an aircraft, it could be mounted to either a left side or a right side and so the inlet 24, 26 on that side will be used and the other will be blocked off. In other examples, the manifold may only have a single inlet. The manifold also has an outlet 28 via which the coolant exits after it has passed through the radiator 30. The coolant may be air (e.g. ambient or cooled air e.g. RAM air in the case of an aircraft) or may be a coolant fluid or gas.

Conventionally, the radiator is machine manufactured using molding or other techniques and the channels have smooth inner walls. According to the present disclosure, the performance of the radiator is improved by forming surface features 40 on the inner walls 350 of the radiator channels 35. These are shown in the example as raised bubbles but may also have other shapes and sizes e.g. ribs, teardrop-shaped pins etc. The surface features provide a non-smooth surface over which the coolant passes as it flows through the radiator channels. The surface features result in the channels having an increased surface area and also induce some turbulence in the flow along the channels, inducing local swirls in the fluid, which improves heat transfer performance of the radiator. Disturbances in flow structure leads to an energy exchange between individual gas particles and the solid surface of the channel, which contributes to higher heat transfer efficiency. There is, however, hardly any change in pressure drop across the channels compared to the smooth channels of the conventional designs. The shape, size, distribution pattern and density of the surface features can be adjusted according to application requirements.

The formation of channels with such surface features have recently become possible due to the advent of and advances in additive manufacturing (AM) technology. AM allows the radiator of this disclosure to be formed with the desired surface features in a simple and economic manner. Alternatively, the channels could be formed using a lost-wax casting method. Other known methods are also possible.

In an example where the coolant is air, the stator is made of steel, the radiator is made of aluminium and the pressure is 4.1 psi at 80 deg. F., tests found an increase in heat transfer coefficient of around 13% for an increase in surface area of around 3%. These parameters are, of course, examples only, but efficiencies are expected due to the use of such surface features.

The invention claimed is:

1. A cooling structure for a rotary electric motor, the cooling structure comprising:

an annular radiator body that axially extends along the rotary electric motor between a first end and a second end, the annular radiator body comprising:

a plurality of isolated channels arranged in an annular configuration and extending between the first end and the second end, each isolated channel comprising:

an outer surface opposite an inner surface;

a first side surface connected to the outer surface and connected to the inner surface;

a second side surface, opposite the first side surface, connected to the outer surface and connected to the inner surface; and a plurality of bubble-shaped surface features dispersed on the outer surface, the inner surface, the first side surface, and the second side surface of each isolated channel between the first end and the second end.

2. The cooling structure of claim 1, wherein the radiator body is formed by additive manufacturing.

3. The cooling structure of claim 1, wherein the radiator body is formed by a lost-wax casting method.

4. The cooling structure of claim 1, further comprising a coolant inlet at the first end and a coolant outlet at the second end.

5. A rotary electric motor comprising a rotor and a stator in coaxial arrangement and a cooling structure as claimed in claim 1 around the rotor and stator inside a housing.

6. A rotary electric motor as claimed in claim 5, further comprising a housing containing the coaxially arranged assembly of the rotor and the stator and the cooling structure.

7. A rotary electric motor as claimed in claim 6, wherein the cooling structure further comprises a coolant inlet at the first end and a coolant outlet at the second end, and wherein the housing includes a manifold defining the coolant inlet and the coolant outlet.

8. A rotary electric motor as claimed in claim 5, further comprising a source of coolant provided to the cooling structure to flow through the channels from the first end to the second end.

9. A rotary electric motor as claimed in claim 8, wherein the coolant is air.

10. A rotary electric motor as claimed in claim 5, wherein the rotary electric motor is a motor in an aircraft.

11. The rotary electric motor as claimed in claim 5, the housing further comprising:

a plurality of inlets fluidically connected to the first end of the annular radiator body; and an outlet fluidically connected to the second end of the annular radiator body, wherein the plurality of isolated channels fluidically connect the plurality of inlets to the outlet.

* * * * *